C. L. CASEY.
COVERED VESSEL FOR COOKING AND LIKE PURPOSES.
APPLICATION FILED JUNE 28, 1912.
1,095,959.
Patented May 5, 1914.
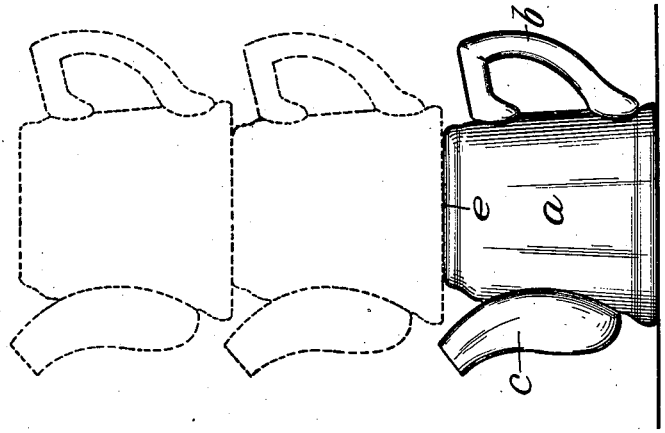
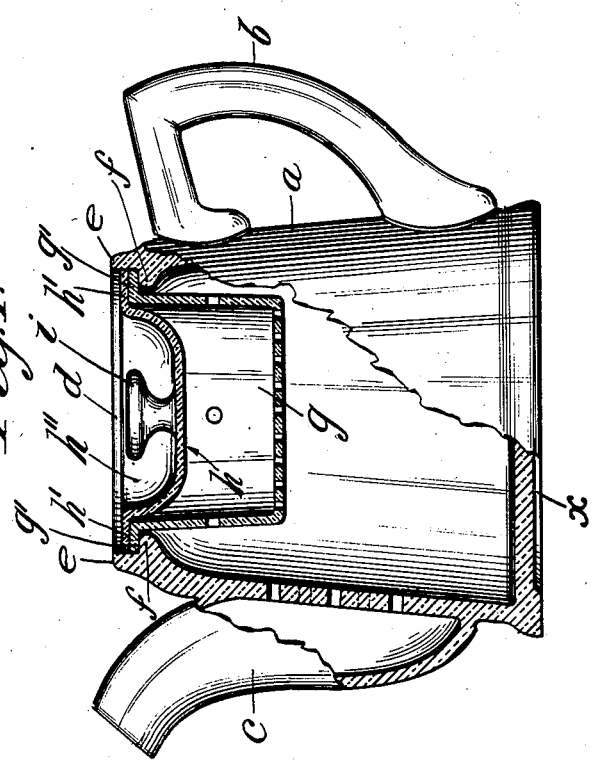

UNITED STATES PATENT OFFICE.

CHARLES L. CASEY, OF CAMBRIDGE, OHIO.

COVERED VESSEL FOR COOKING AND LIKE PURPOSES.

1,095,959. Specification of Letters Patent. Patented May 5, 1914.

Application filed June 28, 1912. Serial No. 706,367.

*To all whom it may concern:*

Be it known that I, CHARLES L. CASEY, a citizen of the United States of America, residing at Cambridge, in the county of Guernsey and State of Ohio, have invented certain new and useful Improvements in Covered Vessels for Cooking and like Purposes, of which the following is a specification, reference being had to the accompanying drawings.

This invention relates to improvements in covered vessels used for cooking or like domestic purposes and more particularly to improvements in coffee- and tea-pots; and an object of this invention is the provision, in a covered vessel or pot of this character, of an arrangement of the cover such that a number of the vessels or pots can be collected or grouped for transportation, package or storage in a minimum of space and possess stability, when grouped.

Another object of this invention is to provide a covered vessel or pot of this character with an interiorly-arranged container or holder the cover for which is the cover of the vessel or pot itself and the support for which serves as the support for the cover, when the container is removed; so that the same cover is adapted equally well for use irrespective of the container's being in place.

In the drawings illustrating the principle of this invention and the best mode now known to me of applying that principle, Figure 1 is an elevation of a tea-pot, partly broken away to disclose the interior construction; and Fig. 2 is a view which shows a number of tea-pots grouped one upon another in a vertical series or stack.

The same reference characters designate corresponding parts throughout the several views.

The body $a$ of the pot is formed with a handle $b$ and, oppositely-disposed thereto, with a spout $c$. In its top the body $a$ is formed with a circular opening or mouth $d$ surrounded or inclosed by the vertical wall or rim $e$ from the bottom of which projects inwardly a ledge $f$. Upon the latter rests the outwardly-extending flange $g'$ of a foraminated container or receptacle $g$, which serves the purpose of a tea-ball. A cover $h$ formed with an outwardly-extending flange $h'$ is provided. The latter flange rests upon the flange $g'$ of the container $g$ and serves as a cover therefor. Furthermore, the flange $h'$ is of such size and shape that it will fit upon the ledge $f$, when the container $g$ is removed or omitted, and the cover $h$ then will serve as the cover of the pot alone. From this arrangement it results that the same cover $h$ serves equally well as the tea-pot cover, whether the container be in place or not.

The cover $h$ is dished or formed with a recess $h''$ centrally-disposed in which is a knob $i$. This knob is, therefore, countersunk and its top does not rise above the plane of the flange $h'$ and is protected from breakage. Again, this arrangement of the cover-knob $i$ enables the tea-pots to be grouped ready for instant use, one upon another in a vertical series which will possess great stability and occupy a minimum of space, since the bottom of one pot may be placed over the mouth of another without interference from the knob of the latter. The bottom of the pot is formed with a circular recess $x$ adapted to receive the rim $e$ surrounding the mouth of the pot below it, the rim snugly fitting within the recess. This nesting feature is important not only to the manufacturer or jobber in the matter of shipping of large quantities of these vessels but is a feature especially valuable where the pots must be kept in a restricted space during an interval when they are not in use, as in dining-car service. In such service space is obviously a very important consideration; and, since the pots are subjected to vibrations and sudden shocks, the vessels must possess stability when grouped.

While I have shown and described this invention as embodied in and applied to a tea-pot, it will be obvious that it may be embodied in any covered vessel designed for cooking or other domestic purposes.

I claim:

A teapot formed in its bottom with a recess within which is adapted to fit snugly the mouth end of a similar teapot, and at its top with a mouth surrounded by a rim-wall and having at the base of the latter an inwardly-extending ledge; a foraminated tea-container arranged within the pot and readily removable therefrom, said container being formed at its mouth with an outwardly-extending flange shaped to rest upon said ledge; and a cover formed with an outwardly-extending flange shaped to fit over and rest upon the flange of the tea-container, when the same is in place, and to fit over and rest upon said ledge, when the tea-container is removed; said cover being further formed with a dish-shaped body-portion and with a knob countersunk within said body-portion and rising from the bottom of the same; all parts of said cover, including its knob, lying wholly below the top edge of the rim-wall surrounding the mouth of the teapot, and the dish-shaped body portion and the knob of said cover lying depressed wholly below the flange thereof, whereby the teapot complete is adapted to form one of a stack of like teapots, substantially as shown and described.

Signed at Cambridge, Ohio, this 24th day of June, A. D., 1912, in the presence of the two undersigned witnesses.

CHARLES L. CASEY.

Witnesses:
   JAMES W. BELL,
   ELLA MARQUAND.